United States Patent [19]

Daussan et al.

[11] Patent Number: 5,409,139
[45] Date of Patent: Apr. 25, 1995

[54] INSTALLATION FOR APPLYING A LINING TO A SURFACE SUCH AS THE INTERIOR OF A METALLURGICAL VESSEL

[75] Inventors: Jean-Charles Daussan, Metz; Gérard Daussan; André Daussan, both of Longeville Les Metz, all of France

[73] Assignee: Daussan et Compagnie, Woippy, France

[21] Appl. No.: 134,547

[22] Filed: Oct. 12, 1993

[51] Int. Cl.$^6$ ............................................. G01G 17/04
[52] U.S. Cl. ..................... 222/77; 222/64; 222/135; 222/145.7; 222/241; 222/413
[58] Field of Search .............. 222/64, 77, 129, 135, 222/145, 226, 241, 413

[56] References Cited

U.S. PATENT DOCUMENTS

| | | | |
|---|---|---|---|
| 4,116,368 | 9/1978 | Smith | 222/145 |
| 4,160,514 | 7/1979 | Taupin | 222/413 X |
| 4,167,248 | 9/1979 | Akazawa et al. | 239/683 |
| 4,392,591 | 7/1983 | Fassauer | 222/241 X |
| 4,443,109 | 4/1984 | Watts | 222/413 X |
| 4,804,111 | 2/1989 | Ricciardi et al. | 222/77 |
| 4,872,786 | 10/1989 | Braden | 406/68 |
| 5,265,763 | 11/1993 | Heinrici et al. | 222/413 X |

FOREIGN PATENT DOCUMENTS 0286513  10/1988  European Pat. Off. .

*Primary Examiner*—Andres Kashnikow
*Assistant Examiner*—Joseph A. Kaufman
*Attorney, Agent, or Firm*—Young & Thompson

[57] ABSTRACT

The installation is intended to apply a lining in one or more layers to a surface, such as the interior of a metallurgical vessel. The installation comprises a silo (1) containing a scraper (13) driven in rotation about a vertical shaft and including, at its lower part, a compartment which emerges via openings within the silo (1) and into a tubular body (2) for propelling the material towards a spray nozzle (7). A dispenser (10) with radial small blades is driven in rotation within the compartment. The installation is particularly useful for coating the interior of metallurgical vessels with one or more layers of an insulating and refractory lining.

10 Claims, 5 Drawing Sheets

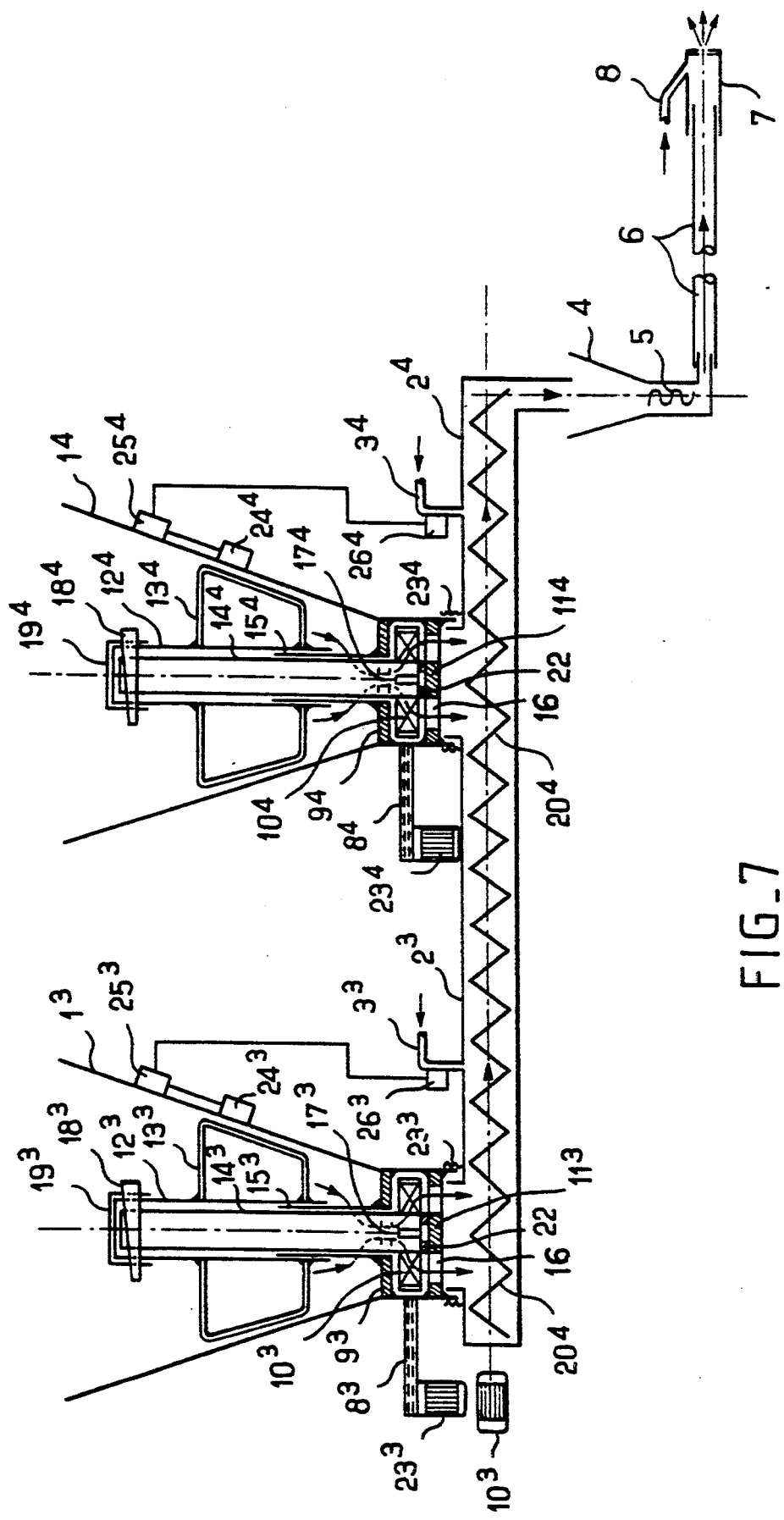
FIG_7

INSTALLATION FOR APPLYING A LINING TO A SURFACE SUCH AS THE INTERIOR OF A METALLURGICAL VESSEL

BACKGROUND OF THE INVENTION

The present invention relates to an installation for applying a lining to a surface such as the interior of a metallurgical vessel, including at least one silo containing the compound of the material to be applied to said surface, means for dispensing the material into a tubular body which includes a propulsion member, possibly supplied with water, the material propelled in said tubular body being conveyed towards a spray nozzle by means of a pump.

SUMMARY OF THE INVENTION

According to the invention, this installation is one in which the silo contains a scraper driven in rotation about a vertical shaft and includes, at its lower part, a compartment which emerges via openings within the silo and into the tubular body and wherein a dispenser with radial small blades within said compartment is driven in rotation by a motor which simultaneously drives the scraper in rotation.

The scraper rotating in the silo stirs and mixes the pulverulent compound contained in the silo.

This compound penetrates into the lower compartment where the dispenser with small blades rotates. From said compartment, the material penetrates into the tubular body where the material, possibly mixed with water, is conveyed by a pump towards a spray nozzle.

According to an advantageous version of the invention, the compartment containing the dispenser is delimited by an upper wall and a lower wall, each including at least one opening which is axially offset by 90° in relation to the opening of the other wall.

The dispenser with small blades is preferably circular and carries, on its periphery, teeth meshed with a chain driven by a motor.

According to a preferred version of the invention, the dispenser with small blades is fast to a vertical shaft on which a tube carrying two radial scraping blades is mounted, this tube being held fast at its upper part to the vertical shaft of the dispenser.

The silo preferably carries a weighing device connected to a flow meter which controls the water supply to the tubular body, in order to slave the water flow rate to the quantity of material contained in the silo.

In one embodiment, the installation includes two silos simultaneously or successively supplying a single tubular body.

In another embodiment, the installation comprises two silos each emerging into a tubular body, the outlets of which are placed above a third silo supplying a tubular body forwarding the material towards a single spray nozzle.

In a third embodiment, the installation comprises two silos each emerging into a tubular body, the outlets of which are placed above a hopper feeding a pump conveying the material towards a single spray nozzle.

Other features and advantages of the invention will further appear in the description hereinbelow.

BRIEF DESCRIPTION OF THE DRAWINGS

In the appended drawings, given by way on non-limiting example:

FIG. 3 is a sectional view in the plane III—III of FIG. 1, FIG. 4 is a sectional view in the plane IV—IV of FIG. 1, FIG. 5 is a sectional view in the plane V—V of FIG. 1, FIG. 6 is a sectional view in the plane VI—VI of FIG. 1, FIG. 7 is a diagrammatic view, in longitudinal cross section, of a first embodiment of an installation according to the invention.

DETAILED DESCRIPTION OF THE INVENTION

Figure 1:
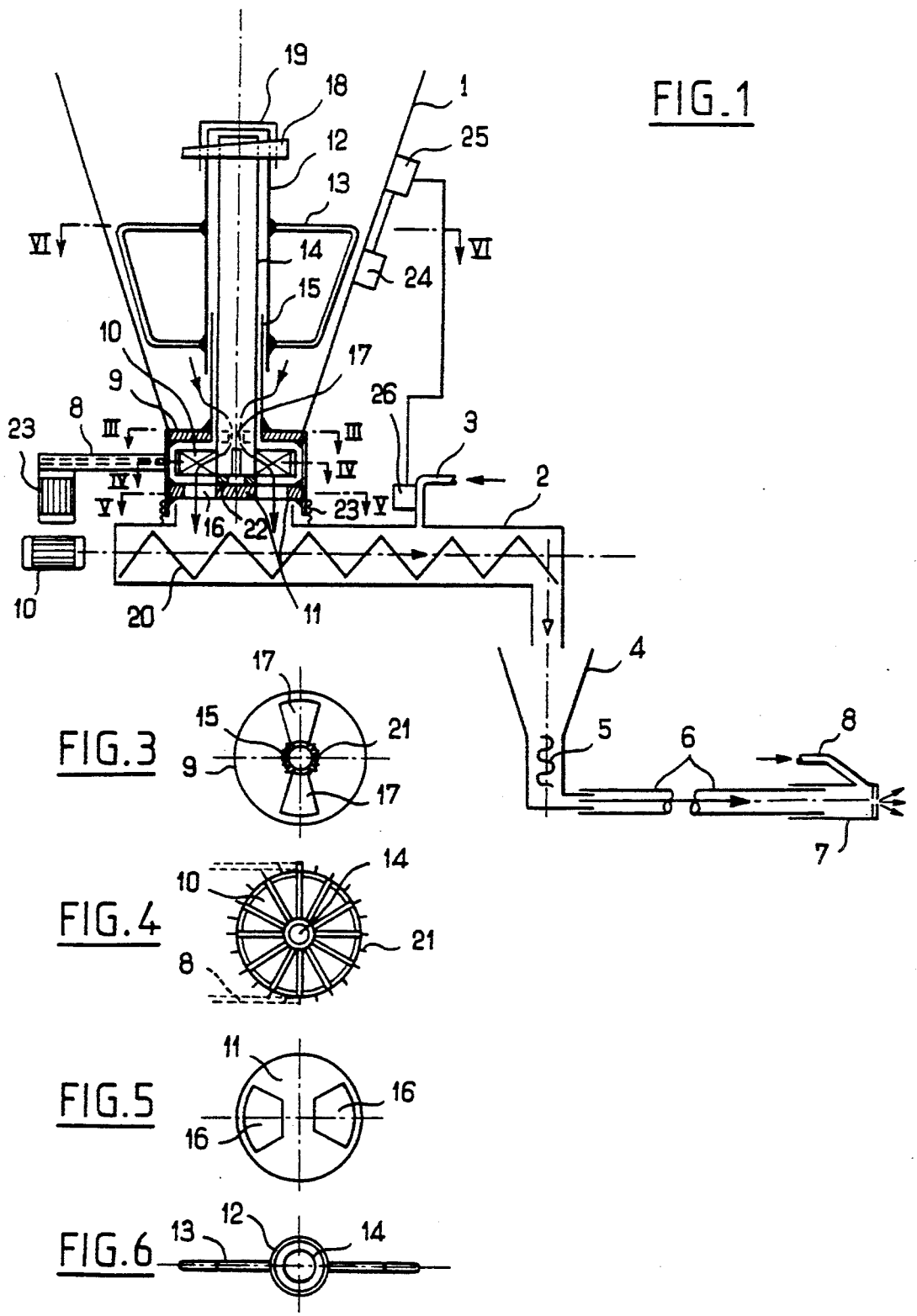
FIG. 1 is a diagrammatic view, in longitudinal cross section, of an installation in accordance with the invention.
Figure 2:
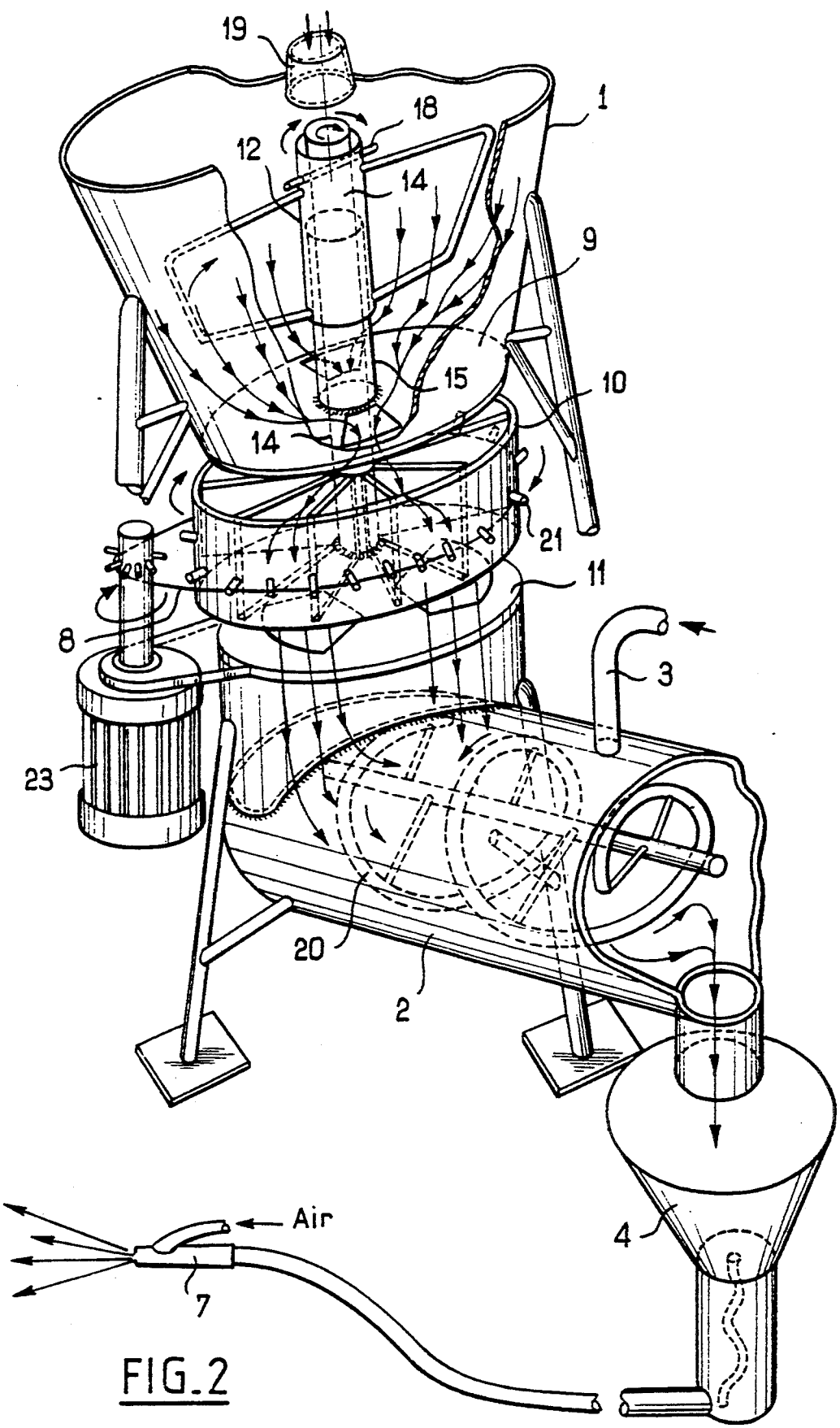
FIG. 2 is a perspective view with cutaways of the installation according to FIG. 1.

The installation shown in FIGS. 1 to 6 is intended to apply an insulating and refractory lining consisting of one or more layers, of equal or unequal thicknesses of the same compound or of different compounds and of equal or different water contents, to surfaces such as, for example, the interior of metallurgical vessels, in which interior one or more aqueous, pasty and curable products are applied to the surfaces. This installation comprises a silo 1 fitted at its base with a toothed dispenser 10 with small blades including one or more slots, the dispenser being driven in rotation by a chain 8 which is itself driven by a motor 23. This dispenser 10 is rigidly fixed to a shaft 14. Its lower part rests on a thrust ball bearing 22. The shaft 14 is surrounded by a prop tube 15 which is held fast to a stationary disk 9 having at least one slot 17 (see FIG. 3), the principal axis of which is oriented for example North/South, said tube 15 being able to be fitted, at its upper interior part, with a ball bearing, not shown. The tube 15 is surrounded by a tube 12 which includes at least one scraper 13. This tube 15 is covered by a cap 19 held fast with the tube 12 and the shaft 14, for example by a key 18 which allows the rotation of the scraper 13 at the same time as that of the dispenser 10.

The compound contained in the silo 1, which is pulverulent at this stage, flows out uniformly by virtue of the scraper 13 through the slot or slots 17 of the stationary disk 9. Next, it is dispensed in a continuous manner by the rotary dispenser 10 which allows it to flow out through the slot or slots 16, oriented for example East/West, of the stationary disk 11 (see FIG. 5) which supplies, for example via a flexible seal 23, the tubular body 2 which preferably includes a Archimedean screw 20 and/or blades, which screw is actuated by the electric motor 10 and which conveys the now pasty compound towards the hopper 4 of a pump 5 which may be a screw pump conveying the pasty compound through the tubing 6 towards the spray nozzle 7 which includes a compressed-air inlet 8.

The silo 1 includes an electric weighing device 24 connected to a computer link 25 which controls the water flow meter 26 fixed to the water pipe 3 emerging into the body 2 and the flow rate of material in order to keep it at a constant predetermined value which can be modified as required. The various seals which in particular equip the dispenser with small blades are not enumerated hereinabove, nor shown in the figures.

FIG. 7 shows an installation including two identical silos $1^3$ and $1^4$, the lower part of which is fitted with a dispenser $10^3$, $10^4$ and with at least one scraper $13^3$ and $13^4$ together with other accessories identical to the complete silo 1 described with reference to FIGS. 1 to 6. The references of the parts identical to those of the embodiment in FIGS. 1 to 6 are assigned an index 3 or 4, such as $1^3$ and $1^4$. The silos $1^3$ and $1^4$ tip their contents into one and the same tubular body $2^4$ which supplies, alternately or simultaneously, the hopper 4 if it is desired, respectively, to spray, by virtue of the nozzle 7, an insulating and refractory lining which includes two layers of different compounds of equal or different water contents and of equal or different thicknesses, or one layer composed of a mixture of two compounds, on the surfaces, for example, of metallurgical vessels.

Figure 8:
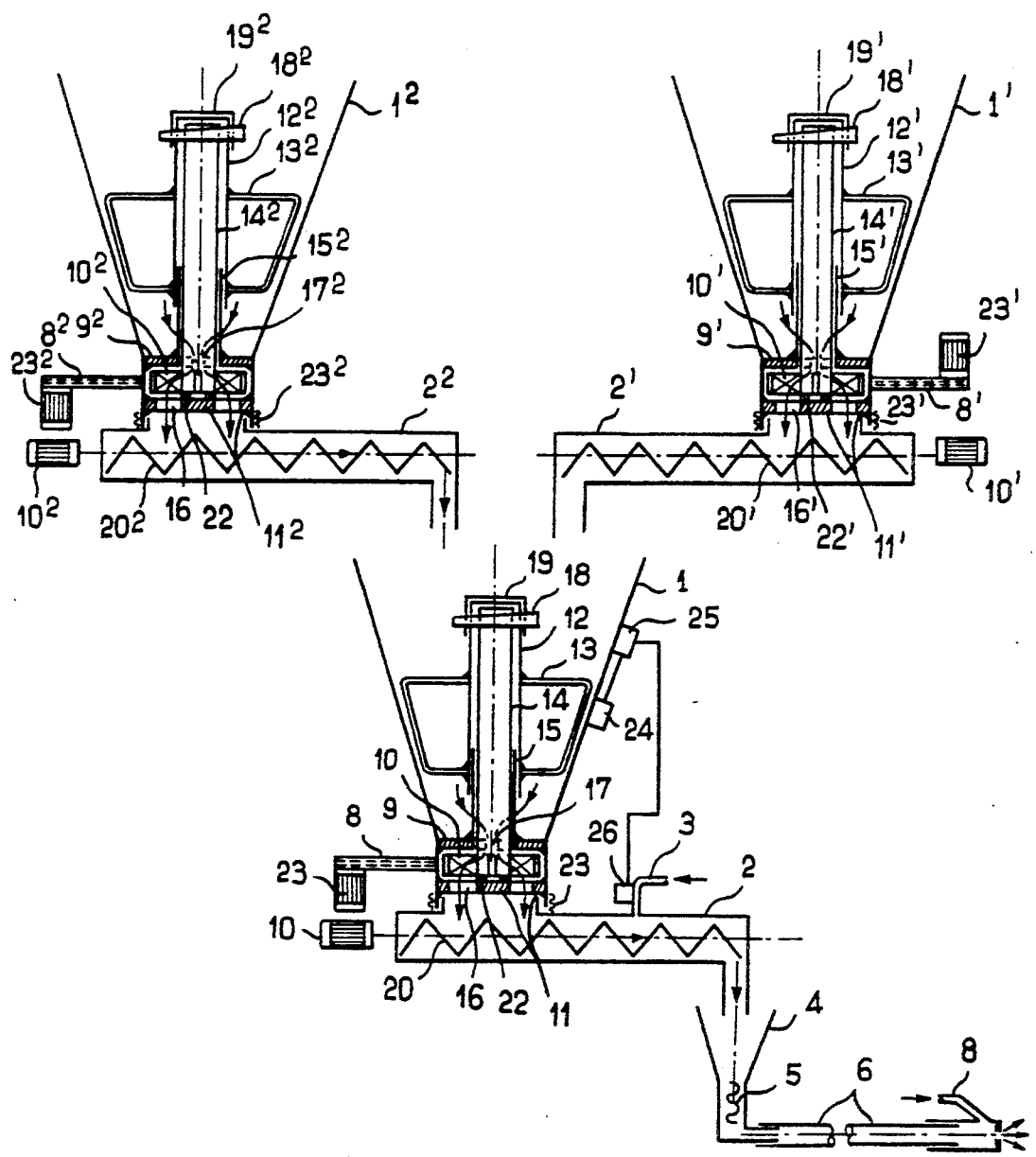
FIG. 8 is a diagrammatic view, in longitudinal cross section, of a second embodiment of an installation according to the invention.

FIG. 8 shows an installation which includes two silos $1'$ and $1^2$ which includes neither a water pipe 3 nor a water flow meter 26. These two silos are preferably intended to convey virtually dry compounds towards the silo 1 via two Archimedean screws $20'$ and $20^2$ driven respectively by two motors $10'$ and $10^2$ so as to spray, at 7, a lining which includes two layers of different compound, of equal or different water contents and of equal or different thicknesses, to the surfaces, for example, of metallurgical vessels.

The structure of the silos $1'$ and $1^2$ and of their accessories is identical to that of the silo 1. The identical members are assigned identical references but bearing $'$ or $^2$ indices, such as $1'$ and $1^2$.

Figure 9:
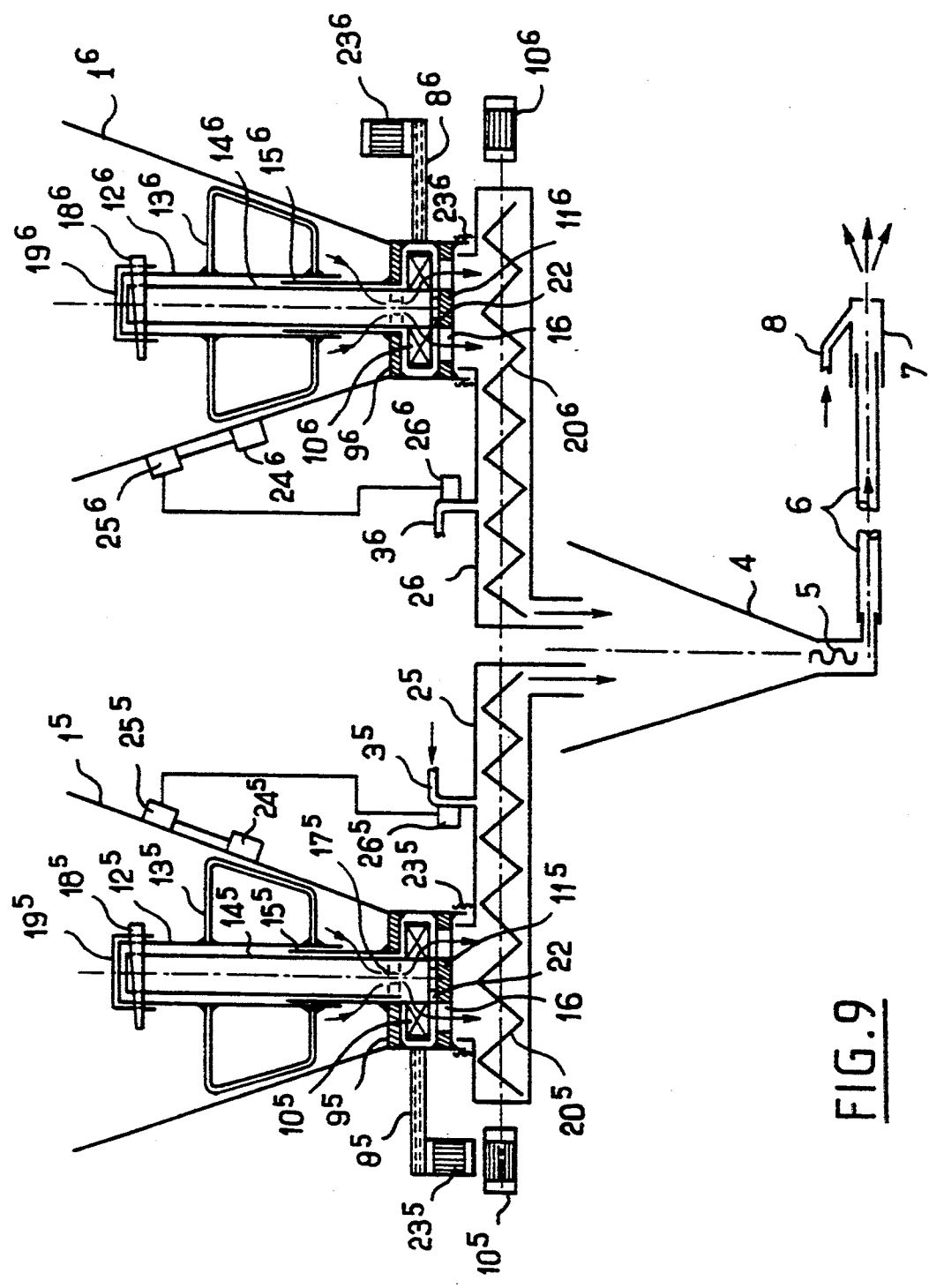
FIG. 9 is a diagrammatic view, in longitudinal cross section, of a third embodiment of an installation according to the invention.

FIG. 9 shows an installation which includes two silos $1^5$ and $1^6$, each of which includes:

a water pipe $3^5$ and $3^6$
a water flow meter $26^5$ and $26^6$
a computer link $25^5$ and $25^6$
an electrical weighing device $24^5$ and $24^6$.

These two silos $1^5$ and $1^6$ supply, via two Archimedean screws $20^5$ and $20^6$, the hopper 4 and the single pump 5 which serves the nozzle 7 with two equal or different compounds, of equal or different water contents, so as to apply an insulating and refractory lining of one or more layers (it is possible to provide a greater number of silos) of equal or different thicknesses to, for example, the interior surfaces of a metallurgical vessel.

The other members of the silos $1^5$ and $1^6$ are identical to those of the silo 1 shown in FIG. 1. The references of these members are assigned indices 5 and 6, such as $1^5$ and $1^6$.

We claim:

1. An installation for applying a lining to a surface, comprising at least one silo containing a compound of a material to be applied to said surface, means for dispensing the material into a tubular body which includes a propulsion member, means for supplying the material with water, pump means for conveying the material propelled in said tubular body towards a spray nozzle, said silo including a scraper driven in rotation about a vertical shaft and, at its lower part, a compartment which emerges via openings within the silo and into the tubular body, a dispenser having radial blades located within said compartment and driven in rotation by a motor which simultaneously drives the scraper in rotation, said compartment being separated from the silo and from the tubular body by an upper and a lower stationary wall, each stationary wall including at least one slot for allowing the material to flow downwardly from the silo into the tubular body via said compartment.

2. The installation as claimed in claim 1, wherein said at least one slot of the stationary upper wall is axially offset in relation to said at least one slot of the stationary lower wall.

3. The installation as claimed in claim 2, wherein the stationary upper and lower walls each have a set of two diametrically opposite slots, the set of slots of the stationary upper wall being axially offset by 90° with respect to the set of slots of the stationary lower wall.

4. The installation as claimed in claim 1, wherein the dispenser is circular and carries, on its periphery, teeth meshed with a chain driven by said motor.

5. The installation as claimed in claim 1, wherein the dispenser is fast to said vertical shaft on which a tube carrying two radial scraping blades is mounted, said tube being held fast at its upper part to the vertical shaft of the dispenser.

6. The installation as claimed in claim 1, wherein the silo carries a weighing device connected to a flow meter which controls the water supply to the tubular body, in order to slave the water flow rate to the quantity of material contained in the silo.

7. The installation as claimed in claim 1, including two silos which simultaneously supply the tubular body.

8. The installation as claimed in claim 1, including two silos which successively supply the tubular body.

9. The installation as claimed in claim 1, further comprising two additional silos each emerging into a discharge body, the discharge body of each of the two silos including an outlet, said outlets being positioned above said at least one silo supplying the tubular body which forwards the material towards the spray nozzle.

10. The installation as claimed in claim 1, further comprising one additional silo emerging into a discharge body, said tubular body and said discharge body each including an outlet, and said outlets being positioned above a hopper feeding the pump means which conveys the material towards the spray nozzle.

* * * * *